United States Patent [19]
Picard et al.

[11] 3,911,198
[45] Oct. 7, 1975

[54] CONTACT ASSEMBLY FOR A METAL-CLAD, GAS-INSULATED HIGH-VOLTAGE LINE

[75] Inventors: Karl-Heinz Picard; Wolfgang Busch; Jürgen Plage, all of Berlin, Germany

[73] Assignee: Siemens Aktiengesellschaft, Munich, Germany

[22] Filed: Dec. 9, 1974

[21] Appl. No.: 530,966

[30] Foreign Application Priority Data
Jan. 8, 1974 Germany............................. 2401093

[52] U.S. Cl................................ 174/28; 174/73 R
[51] Int. Cl.²........................................ H01B 9/04
[58] Field of Search.......... 174/28, 73 R, 142, 99 B, 174/16 B

[56] References Cited
UNITED STATES PATENTS

| | | | |
|---|---|---|---|
| 1,978,649 | 10/1934 | Roberts............................. | 174/142 |
| 3,356,785 | 12/1967 | Yoshida et al....................... | 174/28 |
| 3,585,270 | 6/1971 | Trump................................. | 174/13 |
| 3,652,778 | 3/1972 | Sakai................................... | 174/28 |

FOREIGN PATENTS OR APPLICATIONS

| | | | |
|---|---|---|---|
| 826,940 | 2/1952 | Germany............................. | 174/28 |
| 835,465 | 3/1952 | Germany............................. | 174/28 |
| 856,241 | 6/1940 | France................................ | 174/28 |
| 397,081 | 8/1933 | United Kingdom.................. | 174/28 |

*Primary Examiner*—Arthur T. Grimley
*Attorney, Agent, or Firm*—Kenyon & Kenyon Reilly Carr & Chapin

[57] ABSTRACT

A contact assembly is provided for a metal-encapsulated, gas-insolated high-voltage line having at least one electric conductor for carrying the high voltage. The conductor is supported with respect to the metal enclosure by an insulator defining a surface facing the conductor. The insulator has an electrode at this surface and has at least one slide bearing member for slidably carrying the conductor in the insulator. The slide bearing is made of a material having a hardness less than the hardness of the conductor. The contact assembly electrically connects the electrode to the conductor whereby the electrode is at the potential of the conductor. The contact assembly includes a resilient yoke made of electrically conductive material having respective end-portions conjointly defining an obtuse angle; and carbon contact members mounted on corresponding ones of the end portions for electrically contacting the conductor.

9 Claims, 2 Drawing Figures

U.S. Patent  Oct. 7, 1975  3,911,198
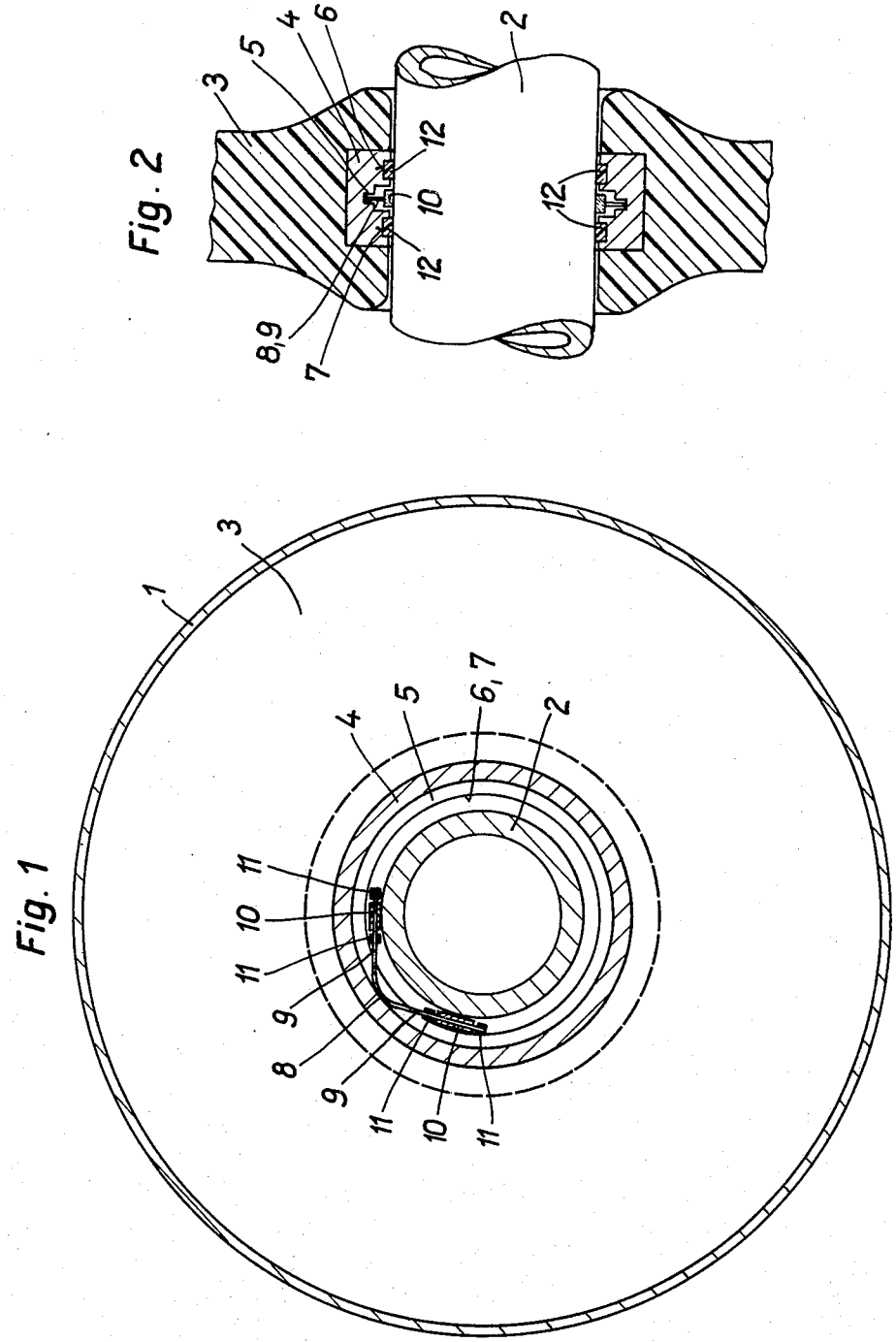

CONTACT ASSEMBLY FOR A METAL-CLAD, GAS-INSULATED HIGH-VOLTAGE LINE

BACKGROUND OF THE INVENTION

The invention relates to a metal-encapsulated, gas-insulated high-voltage line with at least one electric conductor carrying the high voltage and with an insulator which supports the electric conductor with respect to the encapsulation and is provided, on its side facing the conductor, with an electrode at conductor potential.

The electric conductor is guided so as to be movable within the insulator supporting it with respect to the encapsulation. That is, the conductor is guided to be movable lengthwise relative to the encapsulation. To solve this guidance problem, the insulator may be provided with at least one slide bearing part which supports the conductor and is of an electrically insulating material not as hard as the conductor material, the electrode being electrically connected to the conductor through spring-elastic contact elements.

This makes it possible to keep mechanical stresses away from the insulator which are caused by varying electric loads of the high-voltage line which result in a relative motion between the electric conductor and the encapsulation. In this way a favorable prolongation of the service of the insulators made of cast resin, for example, is achieved. Due to the fact that the slide bearing parts are not as hard as the conductor material, there can be no abrasion of the conductor material by the slide bearing parts in case of heat expansion during operation. Such abrasion could otherwise have a detrimental effect on the electrical properties of the high-voltage line. The electrical contact between the electrode of the insulator and the conductor is established by spring-elastic contact elements.

If, for reasons of making a reliable contact in highly loaded high-voltage lines, the spring-elastic contact elements must develop a great contact force and considerable longitudinal movements of the conductor must be expected during the operation of the high-voltage line, it should also be assured that, in the area of the potential transfer from the electric conductor to the electrode provided in the insulator, favorable sliding properties are achieved.

SUMMARY OF THE INVENTION

It is an object of the invention to provide an improved contact assembly for establishing a good electrical contact between the conductor and the electrode of the insulator in a high-voltage line of the above-mentioned type.

It is another object of the invention to provide such a contact assembly which provides a good electrical contact also under the operating conditions described above.

The contact assembly invention according to the invention achieves the foregoing objects by incorporating at least one resilient yoke of electrically conductive material. The yoke ends conjointly define an obtuse angle and carry carbon contact members to electrically engage the conductor. According to a preferred embodiment of the invention, the carbon contact members can slidably engage the conductor. The abrasion caused by the longitudinal movement of the conductor is kept small in this maner, even when the contact forces are great.

According to a feature of the invention, the resilient yoke can be a metal wire. In an alternate embodiment of the invention, the carbon contact members are configured to have a hollow profile at least partly penetrated by the resilient yoke. One particularly advantageous embodiment with respect to a favorable self-adjusting arrangement results from mounting the carbon contact members in the yoke ends so that they can rotate.

Although the invention is illustrated and described herein as a contact assembly for a metal-clad, gas-insulated high-voltage line, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWING

FIG. 1 is a schematic diagram, partially in section, of a metal-clad, gas-insulated high-voltage line equipped with a contact assembly according to the invention.

FIG. 2 is a longitudinal section taken through the insulator whereat the contact assembly according to the invention is mounted.

DESCRIPTION OF THE PREFERRED EMBODIMENTS OF THE INVENTION

The encapsulated high-voltage transmission line shown in FIG. 1 has an encapsulation consisting of an electrically conductive material, in particular metal, of tubular configuration. Disposed in the interior of the encapsulation 1, preferably centrically, is an electric conductor 2 which carries the high voltage and is supported with respect to the encapsulation 1 by means of insulators 3 in the form of discs or holls cones. The interior of the encapsulation 1 is filled with an insulating gas, especially an electronegative gas such as sulfurhexafluoride ($SF_6$) pressurized to, say, 4 bar.

An annular electrode 4, surrounding the electric conductor 2, but spaced from it, is disposed in the insulator 3. The side of the electrode 4 facing the conductor 2 is provided with recesses 5, 6 and 7 of different diameters. The recess 5 serves to accommodate a spring yoke 8, the yoke ends 9 of which include an obtuse angle and carry carbon contact members 10 as sliding contact elements. The carbon contact members 10 are intended to make contact with the outside surface of the electric conductor 2 and transfer the conductor potential to the electrode 4.

The recess 7 is intended to accommodate a sliding bearing part 12 which supports the conductor 2 and consists of an electrically insulating material not as hard as the conductor material. The preferred conductor material is copper and/or aluminm; whereas, polytetrafluorethylene, phenolic resin fabric or the like are preferably used as material for the sliding bearing part.

In the embodiment shown, the spring yoke 8 is made of metal wire. The free yoke ends 9 support the carbon contact members consisting preferably of hollow, profiled pieces. The metal wire penetrates the hollow, profiled pieces in such a manner that the carbon contact members are rotatably retained on the yoke ends. The spring yoke is provided with stops 11 to fix the axial position of the carbn contact members on the yoke ends.

The axial arrangement of the spring yoke can be seen particularly well in FIG. 2 wherein identical parts have the same reference symbols as in FIG. 1. If substantial longitudinal movements of the electric conductor 2 must be expected and unavoidable abrasion of the carbon contact members is to be kept away from the gas space of the encapsulation, also over a very long period of time, it is possible to arrange the resilient contact elements between two axially spaced, ring-shaped sliding bearing parts as shown. In this manner, any abrasion produced is trapped in the space bounded by the two sliding bearing rings.

Instead of the single spring yoke 8 shown in FIG. 1, several spring yokes may also be provided. The spring yoke 8 may be secured in its central region by clamping elements not shown against dropping out of the associated annular slot 5, a certain amount of clearance advantageously being left between the clamping elements and the spring yoke 8. It is also possible to equip the yoke ends with clawlike grippers to grip the carbon contact members.

What is claimed is:

1. In a metal-encapsulated, gas-isolated high-voltage line having at least one electric conductor for carrying the high-voltage, the conductor being supported with respect to the metal enclosure by an insulator defining a surface facing the conductor, the insulator having an electrode at said surface and having at least one slide bearing member for slidably carrying the conductor in the insulator, the slide bearing being made of a material having a hardness less than the hardness of the conductor, and a contact assembly for electrically connecting the electrode to the conductor whereby the electrode is at the potential of the conductor, the contact assembly comprising: a resilient yoke made of electrically conductive material having respective end-portions conjointly defining an obtuse angle; and, carbon contact members mounted on corresponding ones of said end portions for electrically contacting the conductor.

2. The contact assembly of claim 1, said carbon contact members being mounted on said end portions so as to slidably engage the conductor.

3. The contact assembly of claim 1, said resilient yoke being a metal wire.

4. The contact assembly of claim 3, each of said carbon contact members having a hollow profile, said resilient yoke at least partially penetrating each of said carbon contact members.

5. The contact assembly of claim 4, said carbon contact members being rotatably mounted on said end portions respectively.

6. The contact assembly of claim 1, each of said carbon contact members having a hollow profile, said resilient yoke at least partially penetrating each of said carbon contact members.

7. The contact assembly of claim 6, said carbon contact members being rotatably mounted on said end portions respectively.

8. The contact assembly of claim 1 wherein the electrode also has a surface facing the conductor, the contact assembly further comprising: recess means formed in said last-mentioned surface for accommodating said resilient yoke therein.

9. The contact assembly of claim 8 wherein said slide bearing member is an annular slide bearing member and wherein at least two of said annular slide bearing members are arranged at the sides of said recess means respectively, the annular slide members being axially spaced from each other in the direction of the conductor so as to close off said recess means at respective sides of the insulator whereby any abrasion from said carbon contact members is contained within the space between the annular slide bearing members.

* * * * *